United States Patent
Nagasaki (10) Patent No.: US 9,342,762 B2
(45) Date of Patent: May 17, 2016

(54) FUNCTION EXECUTING DEVICE AND SERVER

(71) Applicant: BROTHER KOGYO KABUSHIKI KAISHA, Nagoya-shi, Aichi-ken (JP)

(72) Inventor: Takeshi Nagasaki, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 208 days.

(21) Appl. No.: 13/627,684

(22) Filed: Sep. 26, 2012

(65) Prior Publication Data

US 2013/0135640 A1 May 30, 2013

(30) Foreign Application Priority Data

Nov. 24, 2011 (JP) .................................. 2011-256557

(51) Int. Cl.
| | |
|---|---|
| G06F 3/12 | (2006.01) |
| G06F 15/00 | (2006.01) |
| G06K 15/00 | (2006.01) |
| H04N 1/40 | (2006.01) |
| H04N 1/409 | (2006.01) |
| H04N 1/00 | (2006.01) |

(52) U.S. Cl.
CPC .............. *G06K 15/002* (2013.01); *G06F 3/122* (2013.01); *G06F 3/1271* (2013.01); *G06F 3/1285* (2013.01); *G06K 15/005* (2013.01); *H04N 1/00244* (2013.01); *H04N 1/00408* (2013.01); *H04N 1/00474* (2013.01); *H04N 1/00482* (2013.01); *H04N 1/00973* (2013.01); *H04N 2201/0039* (2013.01); *H04N 2201/0094* (2013.01)

(58) Field of Classification Search
CPC ................... G09G 2370/022; G09G 2340/02; H04N 13/004; H04N 13/007
USPC ......... 358/1.15, 540, 1.12, 1.18, 452; 705/28; 345/600, 667
See application file for complete search history.

(56) References Cited

U.S. PATENT DOCUMENTS

| | | | |
|---|---|---|---|
| 7,362,216 B2* | 4/2008 | Li | ......................... B60Q 9/006 340/431 |
| 8,422,055 B2* | 4/2013 | Honda | ............... H04N 1/00214 358/1.15 |

(Continued)

FOREIGN PATENT DOCUMENTS

| | | |
|---|---|---|
| JP | H11-242677 A | 9/1999 |
| JP | 2001-273228 A | 10/2001 |

(Continued)

*Primary Examiner* — Akwasi M Sarpong
(74) *Attorney, Agent, or Firm* — Merchant & Gould P.C.

(57) ABSTRACT

A function executing device may obtain any of a plurality of screen information from a server, and display a screen represented by the obtained screen information. The function executing device may store in a device-side memory two or more code information corresponding to two or more character strings for displaying a first screen in a case where a creation instruction for creating a shortcut corresponding to the first screen is given, and supply the two or more code information within the device-side memory to the server in a case where a selection instruction for selecting the shortcut is given. In a case where the two or more code information is supplied to the server, the function executing device may obtain first screen information that represents the first screen from the server, and display the first screen represented by the obtained first screen information.

9 Claims, 6 Drawing Sheets

(56) References Cited

U.S. PATENT DOCUMENTS

| | | | |
|---|---|---|---|
| 2006/0215224 A1* | 9/2006 | Matsumoto | H04N 1/2179 358/1.18 |
| 2009/0240673 A1* | 9/2009 | Nagasaki | G10L 15/26 |
| 2010/0029303 A1* | 2/2010 | Lim | H04L 12/1859 455/466 |
| 2010/0202016 A1* | 8/2010 | Matsuzawa | H04N 1/00233 358/1.15 |
| 2011/0055366 A1* | 3/2011 | Okamura | G06F 21/629 709/223 |
| 2011/0058500 A1* | 3/2011 | Nagasaki | H04W 8/183 370/254 |
| 2011/0162085 A1* | 6/2011 | Nagasaki | G06F 21/64 726/28 |
| 2011/0231902 A1* | 9/2011 | Nagasaki | H04L 41/0806 726/3 |
| 2011/0242568 A1* | 10/2011 | Soga | G06F 3/1204 358/1.13 |
| 2011/0258339 A1* | 10/2011 | Matsui | G06F 3/147 709/236 |
| 2012/0113472 A1* | 5/2012 | Urakawa | H04L 67/06 358/1.15 |

FOREIGN PATENT DOCUMENTS

| | | | | |
|---|---|---|---|---|
| JP | 2007-226563 | * | 9/2007 | ........... H04N 1/2179 |
| JP | 2007-226563 A | | 9/2007 | |
| JP | 2007226563 A | * | 9/2007 | |

* cited by examiner

FIG. 2

Display Name Table 36

| Display Name | Server Name | Access Token | PIN Code |
|---|---|---|---|
| Alice | Server A | XXXXXXXX | 1234 |
| Ken | Server A | YYYYYYYY | 2345 |
| Alice | Server B | ZZZZZZZZ | 3456 |
| ⋮ | ⋮ | ⋮ | ⋮ |

FIG. 3

ID Table 68

| Information Type | ID |
|---|---|
| Display Name | 01 |
| PIN Code | 02 |
| Server Name | 03 |
| Access Token | 04 |
| Screen Name | 05 |

| Server Name | ID |
|---|---|
| Server A | 01 |
| Server B | 02 |
| ⋮ | ⋮ |

| Screen Name | ID |
|---|---|
| Scan Setting Screen | 01 |
| Folder Selection Screen | 02 |
| ⋮ | ⋮ |

FIG. 4

Specific Example

Shortcut Name "SC1"

| Display Name | Alice | → 0105Alice |
| PIN Code | 1234 | → 02041234 |
| Server Name | Server A | → 030201 |
| Access Token | XXXXXXXX | → 0408XXXXXXXX |
| Screen Name | Scan Setting Screen | → 050201 |

FUNCTION EXECUTING DEVICE AND SERVER

CROSS-REFERENCE TO RELATED APPLICATIONS

This application claims priority to Japanese Patent Application No. 2011-256557, filed on Nov. 24, 2011, the contents of which are hereby incorporated by reference into the present application.

TECHNICAL FIELD

The present specification discloses a function executing device for executing a specific function including a print function, a scan function, or a combination thereof. The present specification further discloses a server to be connected with the function executing device.

DESCRIPTION OF RELATED ART

For example, an information device comprising a browser function for viewing a home page is known. The information device registers, in a memory of the information device, schedule information, address book information, memo information, etc. in association with URL information of a home page specified by a user.

SUMMARY

The present specification discloses a technique that, in order to a function executing device using a shortcut to display a screen, may reduce a data size to be stored in a memory of the function executing device.

One aspect disclosed in the present application may be a function executing device configured to execute a specific function including a print function, a scan function, or a combination thereof. The function executing device may comprise: a device-side memory; a processor; and an instruction memory configured to store computer-readable instructions therein. The computer-readable instructions, when executed by the processor, may cause the function executing device to perform: (A) obtaining, from a server configured to store a plurality of screen information that represents a plurality of screens related to the specific function, any of the plurality of screen information; (B) displaying a screen represented by the obtained screen information on a display unit; (C) storing in the device-side memory two or more code information corresponding to two or more character strings for displaying a first screen among the plurality of screens in a case where a creation instruction for creating a shortcut corresponding to the first screen is given, each of the two or more code information having a data size which is less than a data size of a corresponding character string; and (D) supplying the two or more code information within the device-side memory to the server in a case where a selection instruction for selecting the shortcut is given. In a case where the two or more code information is supplied to the server: the above (A) may include obtaining first screen information that represents the first screen from the server; and the above (B) may include displaying the first screen represented by the obtained first screen information on the display unit.

Another aspect disclosed in the present application may be a server configured to be connected with a function executing device configured to execute a specific function including a print function, a scan function, or a combination thereof. The server may comprise: a server-side memory configured to store a plurality of screen information that represents a plurality of screens related to the specific function, and store association information in which each of a plurality of character strings and each of a plurality of code information are associated, each of the plurality of code information having a data size which is less than a data size of a corresponding character string; a processor; and an instruction memory configured to store computer-readable instructions therein. The computer-readable instructions, when executed by the processor, may cause the server to perform: (a) supplying any of the plurality of screen information within the server-side memory to the function executing device. In a case where two or more code information corresponding to two or more character strings for displaying a first screen among the plurality of screens are obtained from the function executing device, the (a) may include creating the two or more character strings from the two or more code information in accordance with the association information within the server-side memory, so as to supply first screen information that represents the first screen to the function executing device based on the two or more character strings.

Moreover, a control method, a computer program (that is, computer-readable instructions), and a computer-readable recording medium that stores the computer program, for realizing the function executing device, are also novel and useful. In addition, a control method, a computer program (that is, computer-readable instructions), and a computer-readable recording medium that stores the computer program, for realizing the server, are also novel and useful.

EMBODIMENT (Configuration of System)

Figure 1:
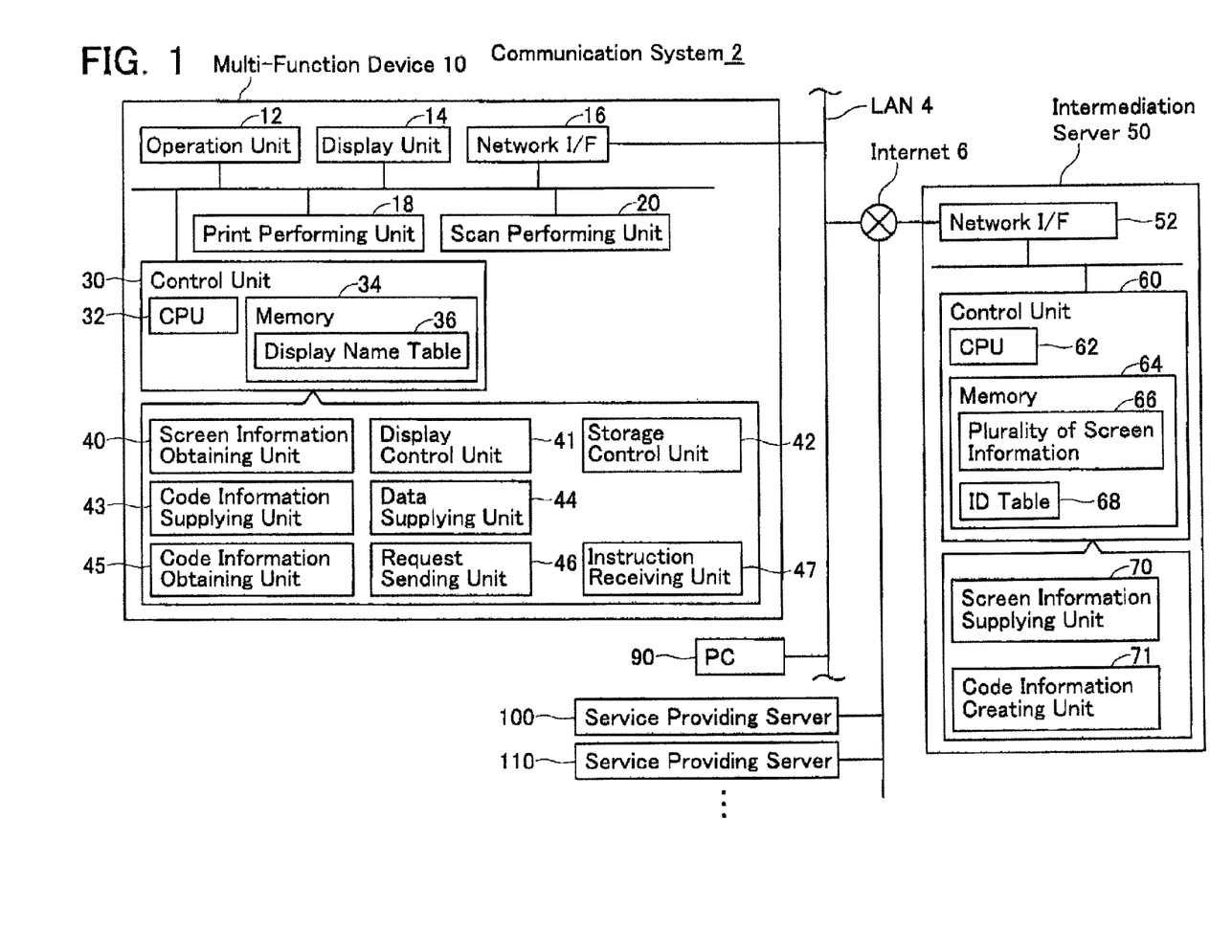
FIG. 1 shows a configuration of a communication system.

As shown in FIG. 1, a communication system 2 comprises a multi-function device 10, an intermediation server 50, a PC 90, and a plurality of service providing servers 100, 110. The multi-function device 10 and the PC 90 are connected with a LAN 4. The intermediation server 50 and the plurality of service providing servers 100, 110 are connected with an internet 6.

(Configuration of Multi-Function Device 10)

The multi-function device 10 is capable of executing multiple functions such as a print function, scan function, copy function, FAX function, etc. The multi-function device 10 is further capable of downloading image data that is being stored in the service providing servers 100, 110 and executing a download print function (called "DL print function" below) for printing an image represented by the image data. Further, the multi-function device 10 is further capable of executing a scan upload function (called "scan UL function" below) for uploading, to the service providing servers 100, 110, the image data created by the multi-function device 10 performing a scan.

The multi-function device 10 comprises an operation unit 12, a display unit 14, a network interface 16, a print performing unit 18, a scan performing unit 20 and a control unit 30. The operation unit 12 comprises a plurality of keys. A user can input various instructions to the multi-function device 10 by operating the operation unit 12. The display unit 14 is a display for displaying various types of information. The network interface 16 is connected with the LAN 4. The print performing unit 18 is an inkjet type or laser type, etc. printing mechanism. The scan performing unit 20 is a CCD or CIS, etc. scanning mechanism.

The control unit 30 comprises a CPU 32 and a memory 34. The CPU 32 executes various processes according to programs stored in the memory 34. The functions of units 40 to 47 are realized by the CPU 32 executing processes according to the programs.

Figure 2:
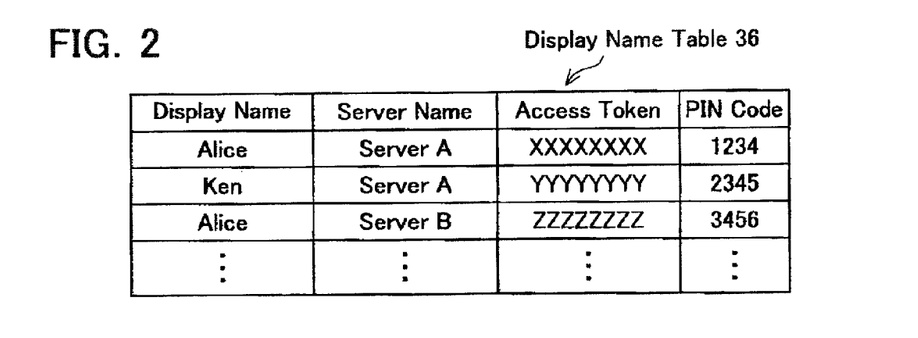
FIG. 2 shows an example of a display name table.

In addition to the aforementioned programs, the memory 34 stores a display name table 36. As shown in FIG. 2, the display name table 36 is a table for storing information in which a display name, a server name, an access token and a PIN code are associated. The manner of creating the display name table 36 will be described in detail later.

(Configuration of Intermediation Server 50)

The intermediation server 50 is a server for intermediating the provision of service to the multi-function device 10 from the service providing servers 100, 110. The intermediation server 50 is a server provided by a vendor of the multi-function device 10. The intermediation server 50 comprises a network interface 52 and a control unit 60. The control unit 60 comprises a CPU 62 and a memory 64. The CPU 62 executes various processes according to programs stored in the memory 64. The functions of units 70, 71 are realized by the CPU 62 executing processes according to the programs.

Moreover, in addition to the aforementioned programs, the memory 64 stores a plurality of screen information 66 and an ID table 68. The plurality of screen information 66 and the ID table 68 are stored in advance in the intermediation server 50 by the vendor of the multi-function device 10. The plurality of screen information 66 includes screen information representing screens (screens 302 to 310, 312 to 316 of FIG. 8; to be described) relating to the print function and scan function that the multi-function device 10 can execute.

Figure 3:
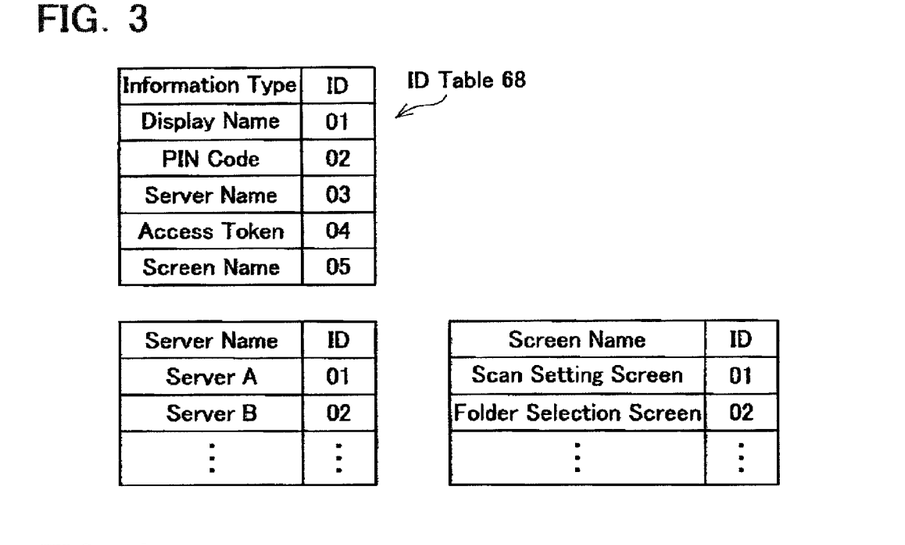
FIG. 3 shows an example of an ID table.

As shown in FIG. 3, the ID table 68 includes an information type table for storing information in which a character string indicating information type and an ID are associated, a server name table for storing information in which a character string indicating a server name and an ID are associated, and a screen name table for storing information in which a character string indicating a screen name and an ID are associated.

Figure 4:
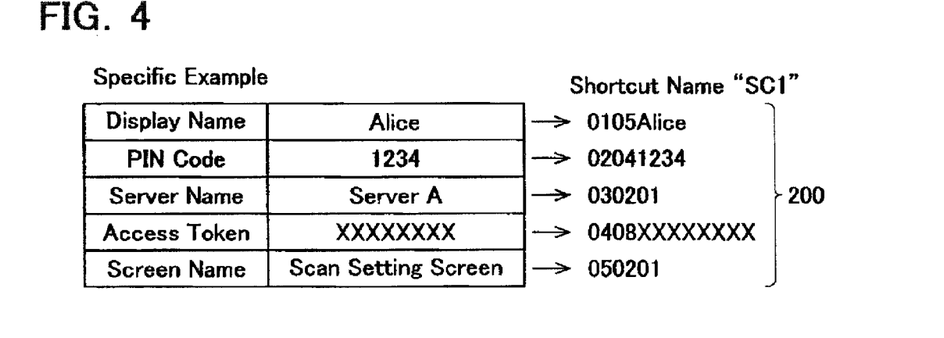
FIG. 4 shows a specific example of character strings and code information.

Since the intermediation server 50 is storing the ID table 68, a code information creating unit 71 (see FIG. 1) of the intermediation server 50 can encode the character strings shown in the specific example of FIG. 4. In the specific example of FIG. 4, e.g., the display name is "Alice". In this case, the code information creating unit 71 identifies an ID "01" corresponding to "Display Name" from the information type table. The code information creating unit 71 can create code information "0105Alice" that indicates the combination of the ID "01" corresponding to "Display Name", the data size (number of bytes) "05" of "Alice", and "Alice". Although the display name "Alice" can be represented by an ordinary character string "Display Name=Alice", if the display name "Alice" is represented by the code information "0105Alice", as in the present embodiment, the data size can be reduced.

The code information creating unit 71 can also encode other character strings in the same manner as in the case for the display name. For example, in case the PIN code is "1234", instead of representing this by an ordinary character string "PIN Code=1234", the code information creating unit 71 can create code information "02041234". Further, in case the server name is "Server A", the code information creating unit 71 identifies an ID "03" corresponding to "Server Name" from the information type table, and identifies an ID "01" corresponding to "Server A" from the server name table. Instead of representing this by an ordinary character string "Server Name=Server A", the code information creating unit 71 can create code information "030201" that indicates the combination of the ID "03" corresponding to "Server Name", the data size (number of bytes) "02" of the ID "01" corresponding to "Server A", and the ID "01" corresponding to "Server A".

Further, in case the access token is "XXXXXXXX", instead of representing this by an ordinary character string "Access Token=XXXXXXXX", the code information creating unit 71 can create code information "0408XXXXXXXX". Further, in case the screen name is "Scan Setting Screen", the code information creating unit 71 identifies an ID "05" corresponding to "Screen Name" from the information type table, and identifies an ID "01" corresponding to "Scan Setting Screen" from the screen name table. Instead of representing this by the ordinary character string "Screen Name=Scan Setting Screen", the code information creating unit 71 can create code information "050201" that indicates the combination of the ID "05" corresponding to "Screen Name", the data size (number of bytes) "02" of the ID "01" corresponding to "Scan Setting Screen", and the ID "01" corresponding to "Scan Setting Screen".

As described above, by using the ID table 68, the code information creating unit 71 can create code information (e.g., "0105Alice") that has a smaller data size than ordinary character strings (e.g., "Display Name=Alice"). Moreover, by using the ID table 68, the control unit 60 (more specifically, a screen information supplying unit 70 (see FIG. 1)) can also create (i.e., reproduce) character strings (e.g., "Display Name=Alice") from the code information (e.g., "0105Alice").

(Configuration of Service Providing Servers 100, 110)

Each of the service providing servers 100, 110 is a known cloud server for, e.g., "Evernote (Registered Trademark)", "Google (Registered Trademark) Docs", "PICASA (Registered Trademark)", "FACEBOOK (Registered Trademark)", etc. Moreover, in the present embodiment, a situation is assumed in which a server name of the service providing server 100 is "Server A" (e.g., "Evernote (Registered Trademark)"), and a server name of the service providing server 110 is "Server B" (e.g., "Google (Registered Trademark) Docs").

Each of the service providing servers 100, 110 is capable of providing services to various communication devices including the multi-function device 10. For example, the service providing servers 100, 110 are capable of executing an image supply service for supplying image data to the multi-function device 10 in order for the multi-function device 10 to execute the DL print function. Further, for example, the service providing servers 100, 110 are capable of executing an image storing service for storing image data obtained from the multi-function device 10 in order for the multi-function device 10 to execute the scan UL function.

Moreover, the service providing server 100 is a server provided by a first service provider (i.e., a first company), and the service providing server 110 is a server provided by a second service provider (i.e., a second company) that is different from the first service provider. The first service provider exposes a first API (Application Program Interface) for receiving a service from the service providing server 100, and the second service provider exposes a second API for receiving a service from the service providing server 110. Since the first service provider and the second service provider are different, the first API and the second API are usually different. In order to receive services from, for example, both the service providing servers 100, 110, communication devices must be compatible with both the first and the second API (i.e., require a program for utilizing the first API and a program for utilizing the second API).

For example, in order for the multi-function device 10 to receive services from each of the plurality of service providing servers 100, 110, the multi-function device 10 must be compatible with the plurality of APIs, and must store many programs. However, the memory capacity of the memory 34 of the multi-function device 10 is smaller than that of a PC, etc. Consequently, in the present embodiment, the intermediation server 50 is provided so that, without having have to store many programs in the multi-function device 10, the multi-function device 10 can receive services from each of the plurality of service providing servers 100, 110. That is, the intermediation server 50 is compatible with a plurality of APIs for the plurality of service providing servers 100, 110. In a situation where the multi-function device 10 is to receive a service from a specific service providing server (e.g., the service providing server 100) from among the plurality of service providing servers 100, 110, the intermediation server 50 executes various communications (to be described; e.g., an upload URL request of FIG. 5) with the specific service providing server by using the API for the specific service providing server. Thereby, despite not being compatible with the API for the specific service providing server, the multi-function device 10 can communicate image data with the specific service providing server. That is, the multi-function device 10 can receive a service from each of the plurality of service providing servers 100, 110 despite not storing many programs for using a plurality of APIs.

(Advance Preparation by User of Multi-Function Device 10)

In order for the multi-function device 10 to receive a service from the service providing servers 100, 110, the user of the multi-function device 10 (called "specific user" below) must execute the following advance preparation. The specific user accesses the intermediation server 50 using, for example, the PC 90. Next the specific user registers, via the intermediation server 50, a display name (e.g., "Alice") and a PIN code (e.g., "1234") in the service providing server 100 having the server name "Server A". In this case, the intermediation server 50 obtains, from the service providing server 100, an access token (generally called "authentication information"; e.g., "XXXXXXXX") for the specific user. The intermediation server 50 creates a temporary ID, and sends the temporary ID to the PC 90. Thereby, the temporary ID is displayed in the PC 90. The specific user can learn the temporary ID displayed in the PC 90.

Next, by operating the operation unit 12 of the multi-function device 10, the specific user inputs, into the multi-function device 10, the server name (e.g., "Server A") of the service providing server 100, the display name (e.g., "Alice") registered in the service providing server 100, and the PIN code (e.g., "1234") registered in the service providing server 100. Further, by operating the operation unit 12 of the multi-function device 10, the specific user inputs the temporary ID into the multi-function device 10. In this case, the multi-function device 10 sends the temporary ID to the intermediation server 50. Thereby, the intermediation server 50 sends the access token (e.g., "XXXXXXXX") to the multi-function device 10.

By executing the aforementioned processes, the multi-function device 10 can store information in the display name table 36. In the above example, the multi-function device 10 stores, in the display name table 36, information in which the following are associated: the display name (e.g., "Alice") input by the specific user, the server name (e.g., "Server A") input by the specific user, the access token (e.g., "XXXXXXXX") obtained from the intermediation server 50, and the PIN code (e.g., "1234") input by the specific user. Moreover, the specific user can register a display name (e.g., "Alice") and a PIN code (e.g., "3456") in the service providing server 110, as well, in the same manner as above. In this case, the multi-function device 10 stores new information (e.g., "Alice", "Server B", "ZZZZZZZZ", "3456") in the display name table 36.

Figure 5:
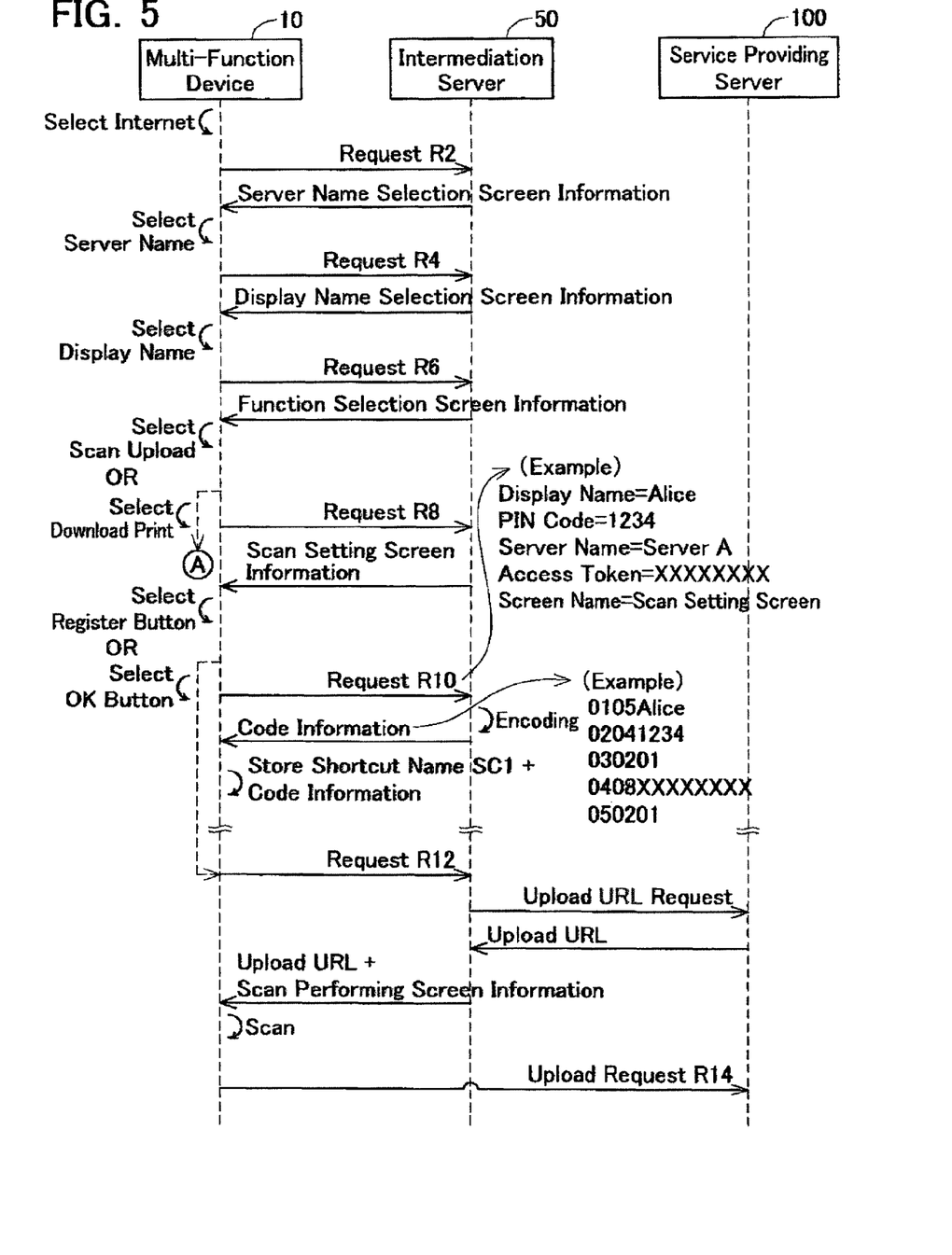
FIG. 5 shows a sequence view of processes executed by devices when scan upload is executed.

(Processes for Multi-Function Device 10 to Execute Scan UL Function; FIG. 5)

Next, the contents of processes executed by the devices 10, 50, 100 when the multi-function device 10 is to execute the scan UL function will be described with reference to FIG. 5.

Although not shown, a display control unit 41 (see FIG. 1) of the multi-function device 10 displays a main screen 300 (see FIG. 8) on the display unit 14 by using main screen information stored in advance in the multi-function device 10. The main screen 300 includes a plurality of character strings (e.g., "Internet", "Shortcut", "Copy" etc.) indicating a plurality of functions to be selected by the user. In case of wanting the multi-function device 10 to execute the scan UL function, the specific user operates the operation unit 12 to select the character string "Internet" included in the main screen 300. In this case, a screen information obtaining unit 40 (see FIG. 1) supplies a request R2 to the intermediation server 50.

Upon obtaining the request R2 from the multi-function device 10, the screen information supplying unit 70 (see FIG. 1) of the intermediation server 50 supplies, to the multi-function device 10, server name selection screen information included in the plurality of screen information 66.

The screen information obtaining unit 40 of the multi-function device 10 obtains the server name selection screen information from the intermediation server 50. In this case, the display control unit 41 displays a server name selection screen 302 (see FIG. 8), this being represented by the server name selection screen information, on the display unit 14. The server name selection screen 302 includes one or more character strings (e.g., "Server A", "Server B") indicating the server names of the one or more service providing servers 100, 110. In the present embodiment, the description will proceed using the case, as an example, where the specific user operates the operation unit 12 to select the character string "Server A" (i.e., the server name of the service providing server 100) included in the server name selection screen 302. In this case, the screen information obtaining unit 40 supplies a request R4 that includes the character string "Server A" to the intermediation server 50.

Although not shown, upon obtaining the request R4 from the multi-function device 10, the screen information supplying unit 70 of the intermediation server 50 obtains the display name table 36 from the multi-function device 10. The screen information supplying unit 70 identifies, from within the display name table 36, one or more character strings (e.g., "Alice", "Ken") indicating one or more display names associated with the character string "Server A" included in the request R4. Next, the screen information supplying unit 70 writes the specified one or more character strings (e.g., "Alice", "Ken") in display name selection screen information included in the plurality of screen information 66. Then, the screen information supplying unit 70 supplies, to the multi-function device 10, the display name selection screen information in which the one or more character strings have been written.

The screen information obtaining unit 40 of the multi-function device 10 obtains the display name selection screen information from the intermediation server 50. In this case, the display control unit 41 displays, on the display unit 14, a display name selection screen 304 (see FIG. 8) represented by the display name selection screen information. The display name selection screen 304 includes one or more character strings (e.g., "Alice", "Ken") indicating one or more display names. In the present embodiment, the description will proceed using the case, as an example, where the specific user operates the operation unit 12 to select the character string "Alice" included in the display name selection screen 304. In this case, the screen information obtaining unit 40 supplies a request R6 that includes the character string "Alice" to the intermediation server 50.

Upon obtaining the request R6 from the multi-function device 10, the screen information supplying unit 70 of the intermediation server 50 supplies function selection screen information included in the plurality of screen information 66 to the multi-function device 10.

The screen information obtaining unit 40 of the multi-function device 10 obtains the function selection screen information from the intermediation server 50. In this case, the display control unit 41 displays, on the display unit 14, a function selection screen 306 (see FIG. 8) represented by the function selection screen information. The function selection screen 306 includes a character string "Scan Upload" indicating the scan UL function and a character string "Download Print" indicating the DL print function. Here, the description will proceed using the case, as an example, where the specific user operates the operation unit 12 to select the character string "Scan Upload" included in the function selection screen 306. In this case, the screen information obtaining unit 40 supplies a request R8 that includes the character string "Scan Upload" to the intermediation server 50.

Upon obtaining the request R8 from the multi-function device 10, the screen information supplying unit 70 of the intermediation server 50 supplies, to the multi-function device 10, scan setting screen information included in the plurality of screen information 66.

The screen information obtaining unit 40 of the multi-function device 10 obtains the scan setting screen information from the intermediation server 50. In this case, the display control unit 41 displays, on the display unit 14, a scan setting screen 308 (see FIG. 8) represented by the scan setting screen information. As described above, the specific user must execute various selections on the plurality of screens 300, 302, 304, 306 until the scan setting screen 308 is displayed on the display unit 14. The shortcut function is provided in the multi-function device 10 to reduce this burden on the specific user. By operating the operation unit 12 to select a "register" button included in the scan setting screen 308, the specific user can give a shortcut creation instruction to the multi-function device 10.

When the shortcut creation instruction is given, a data supplying unit 44 (see FIG. 1) of the multi-function device 10 supplies a request R10 to the intermediation server 50. The request R10 includes the two character strings ("Display Name=Alice", "Server Name=Server A") selected by the specific user on the two selection screens 302, 304, the two character strings ("Access Token=XXXXXXXX", "PIN Code=1234") stored in association with "Alice" and "Server A" in the display name table 36, and the one character string ("Screen Name=Scan Setting Screen") indicating the scan setting screen where the shortcut creation instruction was given. That is, the request R10 includes five character strings in total. The five character strings may be included in the request R10 as query information appended to a destination address of the request R10, or included in a body of the request R10.

Upon obtaining the request R10 from the multi-function device 10, the code information creating unit 71 of the intermediation server 50 encodes, according to the ID table 68, the five character strings included in the request R10, thereby creating five code information. Since the creation of code information has already been described, a detailed description thereof is omitted here. The five code information include "0105Alice", "02041234", "030201", "0408XXXXXXXX" and "050201". The code information creating unit 71 supplies the five code information to the multi-function device 10.

A code information obtaining unit 45 (see FIG. 1) of the multi-function device 10 obtains the five code information from the intermediation server 50. In this case, a storage control unit 42 (see FIG. 1) stores, in the memory 34, information (called "shortcut information" below) in which the following are associated: a name (called "shortcut name SC1" below) that identifies the shortcut of the scan setting screen 308, and the five code information.

On the other hand, the specific user can operate the operation unit 12 to select, on the scan setting screen 308 (see FIG. 8), various setting items for scanning (scan resolution, file format, size of scan data). The specific user can operate the operation unit 12 to select an "OK" button included in the scan setting screen 308. In this case, the screen information obtaining unit 40 supplies a request R12 to the intermediation server 50.

Upon obtaining the request R12 from the multi-function device 10, the screen information supplying unit 70 of the intermediation server 50 creates an upload URL request according to the first API, and supplies the upload URL request to the service providing server 100. The upload URL request is a request for instructing the service providing server 100 to supply, to the intermediation server 50, a URL (i.e., a URL of an upload destination; called "upload URL" below) that indicates a location within the service providing server 100 where image data created by scanning is to be stored.

Moreover, as described above, before supplying the display name selection screen information to the multi-function device 10, the intermediation server 50 obtains the display name table 36 from the multi-function device 10. Consequently, the intermediation server 50 can identify, from the display name table 36, the access token "XXXXXXXX" associated with the character string "Server A" included in the request R2, and the character string "Alice" included in the request R4. The intermediation server 50 causes the service providing server 100 to execute authentication, using the access token "XXXXXXXX", at the stage of supplying the upload URL request to the service providing server 100, or at an earlier stage. Thereby, the service providing server 100 can send an appropriate response to the intermediation server 50 in response to the upload URL request supplied from the intermediation server 50. Moreover, below, a description of the authentication using the access token is omitted. However, as required (e.g., each time a request is sent to the service providing server 100), the intermediation server 50 may cause the service providing server 100 to execute authentication using the access token.

Upon obtaining the upload URL request, the service providing server 100 supplies the upload URL to the intermediation server 50.

Upon obtaining the upload URL from the service providing server 100, the screen information supplying unit 70 of the intermediation server 50 supplies, to the multi-function device 10, the upload URL and scan performing screen information included in the plurality of screen information 66.

The screen information obtaining unit 40 of the multi-function device 10 obtains the scan performing screen information from the intermediation server 50. In this case, the display control unit 41 displays, on the display unit 14, a scan performing screen 310 (see FIG. 8) represented by the scan performing screen information. Thereby, the specific user can learn that the scan UL function is being executed. Further, upon obtaining the upload URL from the intermediation server 50, the control unit 30 causes the scan performing unit 20 to scan a document. Next, the control unit 30 supplies an upload request R14, this including the upload URL obtained from the intermediation server 50 and the image data created by the scan performing unit 20, to the service providing server 100 without intermediating through the intermediation server 50. In the present embodiment, the upload request R14 is communicated without intermediating through the intermediation server 50, and therefore private images of the specific user can be prevented from being transmitted through the intermediation server 50.

Upon obtaining the upload request R14, the service providing server 100 stores the image data included in the upload request R14 in a location indicated by the upload URL included in the upload request R14. Thereby, the processes related to the scan UL function end.

Figure 6:
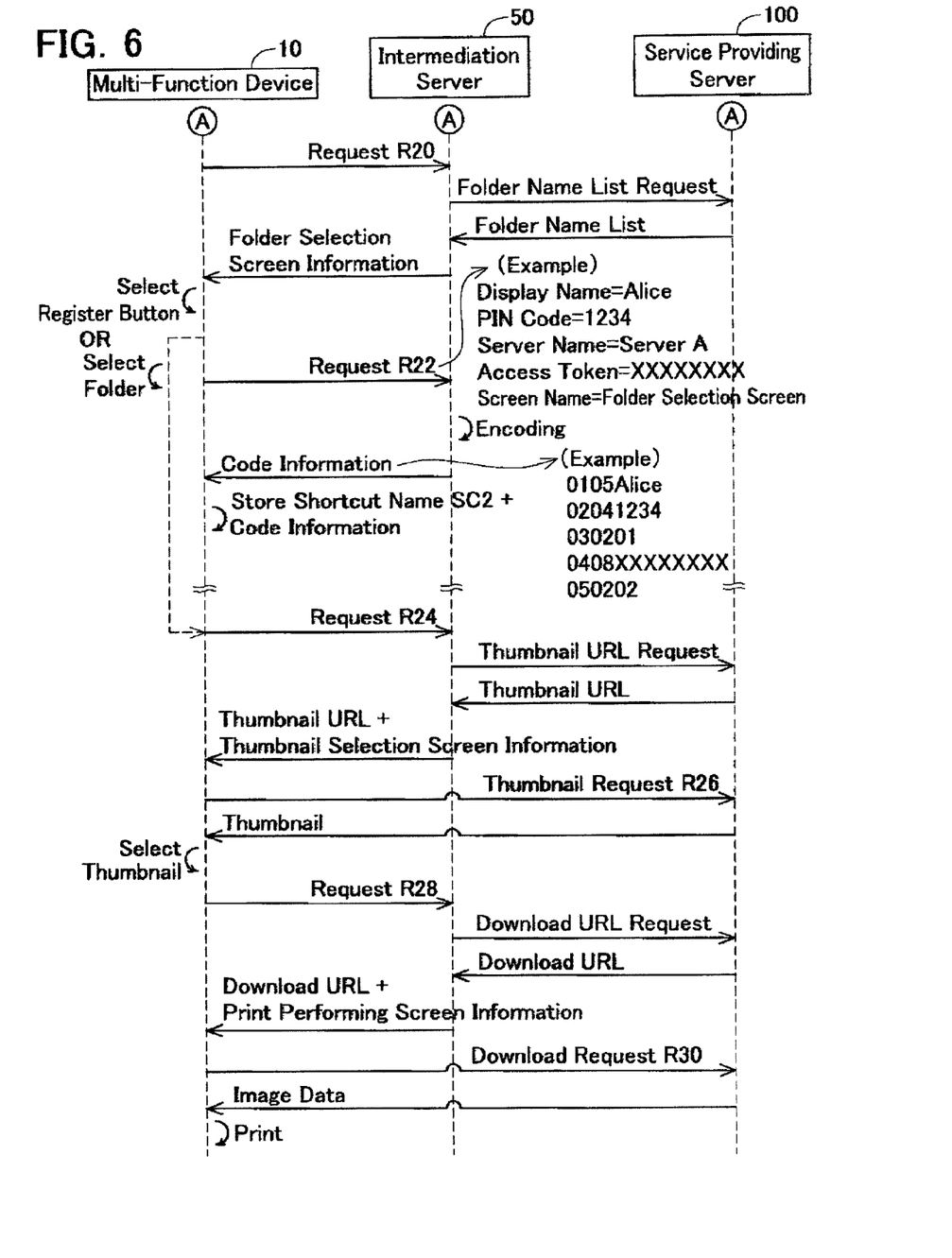
FIG. 6 shows a sequence view of processes executed by devices when download print is executed.

(Processes for Multi-Function Device 10 to Execute DL Print Function; FIG. 6)

Next, the contents of processes executed by the devices 10, 50, 100 when the multi-function device 10 is to execute the DL print function will be described with reference to FIG. 6. Moreover, the processes executed by the devices 10, 50, 100 until the function selection screen 306 is displayed on the display unit 14 of the multi-function device 10 are the same as the processes of FIG. 5.

Figure 8:
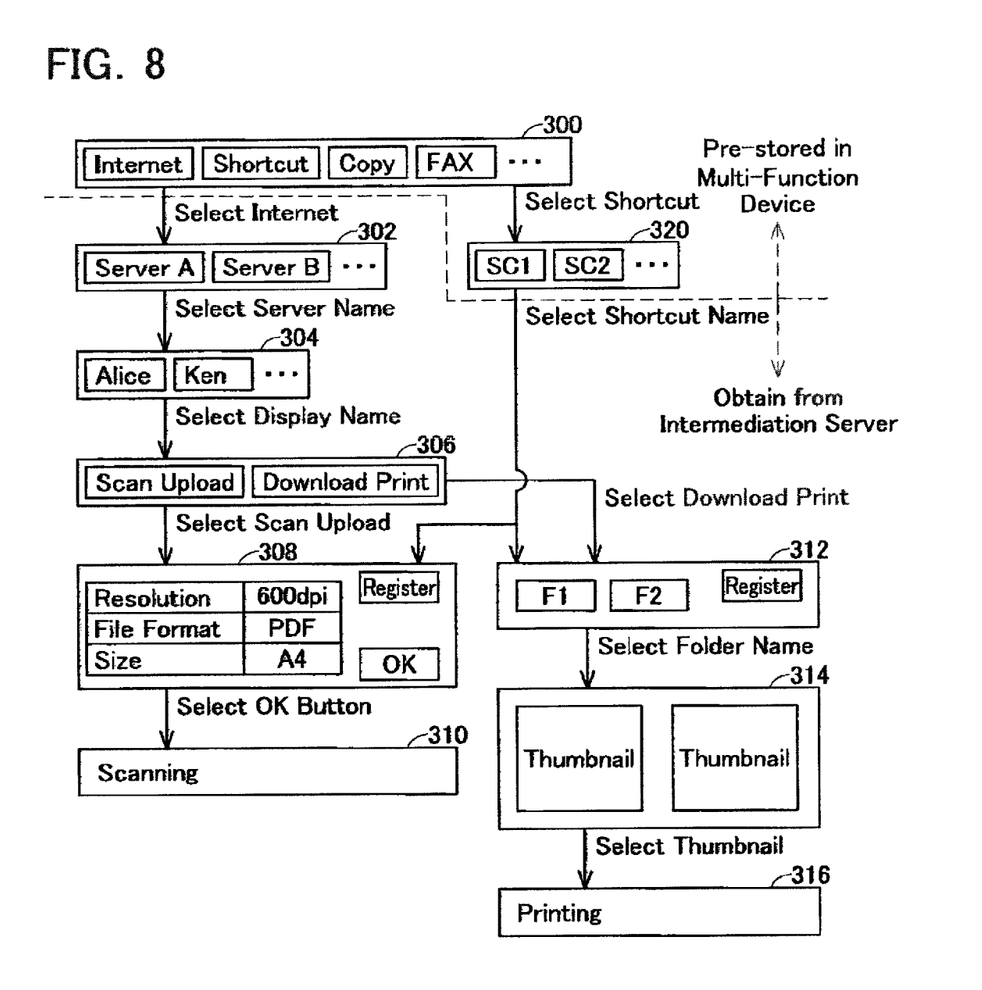
FIG. 8 shows a transition of screens displayed in the multi-function device.

The specific user operates the operation unit 12 to select a character string "Download Print" included in the function selection screen 306 (see FIG. 8). In this case, the screen information obtaining unit 40 supplies, to the intermediation server 50, a request R20 that includes the character string "Download Print".

Upon obtaining the request R20 from the multi-function device 10, the screen information supplying unit 70 of the intermediation server 50 creates, according to the first API, a folder name list request, and supplies the folder name list request to the service providing server 100. The folder name list request is a request for instructing the service providing server 100 to supply, to the intermediation server 50, a folder name list that indicates one or more folder names storing the image data uploaded by the specific user (i.e., the display name "Alice").

Upon obtaining the folder name list request, the service providing server 100 supplies the folder name list to the intermediation server 50.

Upon obtaining the folder name list from the service providing server 100, the screen information supplying unit 70 of the intermediation server 50 writes, in folder selection screen information included in the plurality of screen information 66, one or more character strings (e.g., "F1", "F2") indicating one or more folder names included in the folder name list. Then, the screen information supplying unit 70 supplies the folder selection screen information, in which the one or more character strings have been written, to the multi-function device 10.

The screen information obtaining unit 40 of the multi-function device 10 obtains the folder selection screen information from the intermediation server 50. In this case, the display control unit 41 displays, on the display unit 14, a folder selection screen 312 (see FIG. 8) represented by the folder selection screen information. By operating the operation unit 12 to select a "register" button included in the folder selection screen 312, the specific user can give a shortcut creation instruction to the multi-function device 10.

When the shortcut creation instruction from the specific user has been given, the data supplying unit 44 of the multi-function device 10 supplies a request R22 to the intermediation server 50. Moreover, as with the request R10 of FIG. 5, the request R22 includes five character strings. However, instead of the character string "Screen Name=Scan Setting Screen", the request R22 includes the character string ("Screen Name=Folder Selection Screen") indicating the folder selection screen given by the shortcut creation instruction.

Upon obtaining the request R22 from the multi-function device 10, the code information creating unit 71 of the intermediation server 50 creates five code information, as in the case of FIG. 5. However, since the character string "Screen Name=Folder Selection Screen" is included in the request R22 in the case of FIG. 6, the code information creating unit 71 creates code information "050202" instead of the code information "050201". The code information creating unit 71 supplies the five code information to the multi-function device 10.

The code information obtaining unit 45 of the multi-function device 10 obtains the five code information from the intermediation server 50. In this case, the storage control unit 42 stores, in the memory 34, information (called "shortcut information" below) in which the following are associated: a name (called "shortcut name SC2" below) that identifies the shortcut of the folder selection screen 312, and the five code information.

On the other hand, the specific user can operate the operation unit 12 to select one character string (e.g., "F1") included in the folder selection screen 312 (see FIG. 8). In this case, the screen information obtaining unit 40 supplies, to the intermediation server 50, a request R24 that includes one character string (e.g., "F1") selected by the specific user.

Upon obtaining the request R24 from the multi-function device 10, the screen information supplying unit 70 of the intermediation server 50 creates a thumbnail URL request according to the first API, and supplies the thumbnail URL request to the service providing server 100. The thumbnail URL request is a request for instructing the service providing server 100 to supply, to the intermediation server 50, URLs (called "one or more thumbnail URLs" below) of one or more thumbnail image data corresponding to one or more image data being stored in the folder indicated by the character string (e.g., "F1") included in the request R24.

Upon obtaining the thumbnail URL request, the service providing server 100 supplies one or more thumbnail URLs to the intermediation server 50.

Upon obtaining the one or more thumbnail URLs from the service providing server 100, the screen information supplying unit 70 of the intermediation server 50 supplies, to the multi-function device 10, the one or more thumbnail URLs and thumbnail selection screen information included in the plurality of screen information 66.

The screen information obtaining unit 40 of the multi-function device 10 obtains the one or more thumbnail URLs and the thumbnail selection screen information from the intermediation server 50. In this case, the control unit 30 supplies a thumbnail request R26 that includes the one or more thumbnail URLs to the service providing server 100 without intermediating through the intermediation server 50.

Upon obtaining the thumbnail request R26, the service providing server 100 supplies one or more thumbnail image data, these being stored at a location indicated by the one or more thumbnail URLs included in the thumbnail request R26, to the multi-function device 10 without intermediating through the intermediation server 50. In the present embodiment, the thumbnail image data is communicated without intermediating through the intermediation server 50, and therefore private images of the specific user can be prevented from being transmitted through the intermediation server 50.

Upon obtaining the one or more thumbnail image data from the service providing server 100, the display control unit 41 of the multi-function device 10 combines the one or more thumbnail image data in the thumbnail selection screen information. The display control unit 41 displays, on the display unit 14, a thumbnail selection screen 314 (see FIG. 8) represented by the thumbnail selection screen information in which the one or more thumbnail image data have been combined. The specific user can operate the operation unit 12 to select one thumbnail image included in the thumbnail selection screen 314. In this case, the control unit 30 supplies, to the intermediation server 50, a request R28 that includes one image ID (called "specific image ID" below) for identifying the one thumbnail image selected by the specific user.

Upon obtaining the request R28 from the multi-function device 10, the screen information supplying unit 70 of the intermediation server 50 creates, according to the first API, a download URL request that includes the specific image ID, and supplies the download URL request to the service providing server 100. The download URL request is a request for instructing the service providing server 100 to supply, to the intermediation server 50, a URL (i.e., a URL of a download source; called "download URL" below) that indicates a location within the service providing server 100 where source image data of the thumbnail image data representing the thumbnail image specified by the specific image ID is being stored.

Upon obtaining the download URL request, the service providing server 100 supplies the download URL to the intermediation server 50.

Upon obtaining the download URL from the service providing server 100, the screen information supplying unit 70 of the intermediation server 50 supplies, to the multi-function device 10, the download URL and print performing screen information included in the plurality of screen information 66.

The screen information obtaining unit 40 of the multi-function device 10 obtains the print performing screen information from the intermediation server 50. In this case, the display control unit 41 displays, on the display unit 14, a print performing screen 316 (see FIG. 8) represented by the print performing screen information. Thereby, the specific user can learn that the DL print function is being executed. Further, upon obtaining the download URL from the intermediation server 50, the control unit 30 supplies a download request R30 that includes the download URL to the service providing server 100 without intermediating through the intermediation server 50.

Upon obtaining the download request R30, the service providing server 100 supplies image data, which is being stored in the location indicated by the download URL included in the download request R30, to the multi-function device 10 without intermediating through the intermediation server 50. In the present embodiment, the image data is communicated without intermediating through the intermediation server 50, and therefore private images of the specific user can be prevented from being transmitted through the intermediation server 50.

Upon obtaining the image data from the service providing server 100, the control unit 30 of the multi-function device 10 causes the print performing unit 18 to print an image represented by the image data. Thereby, processes related to the DL print function end.

Figure 7:
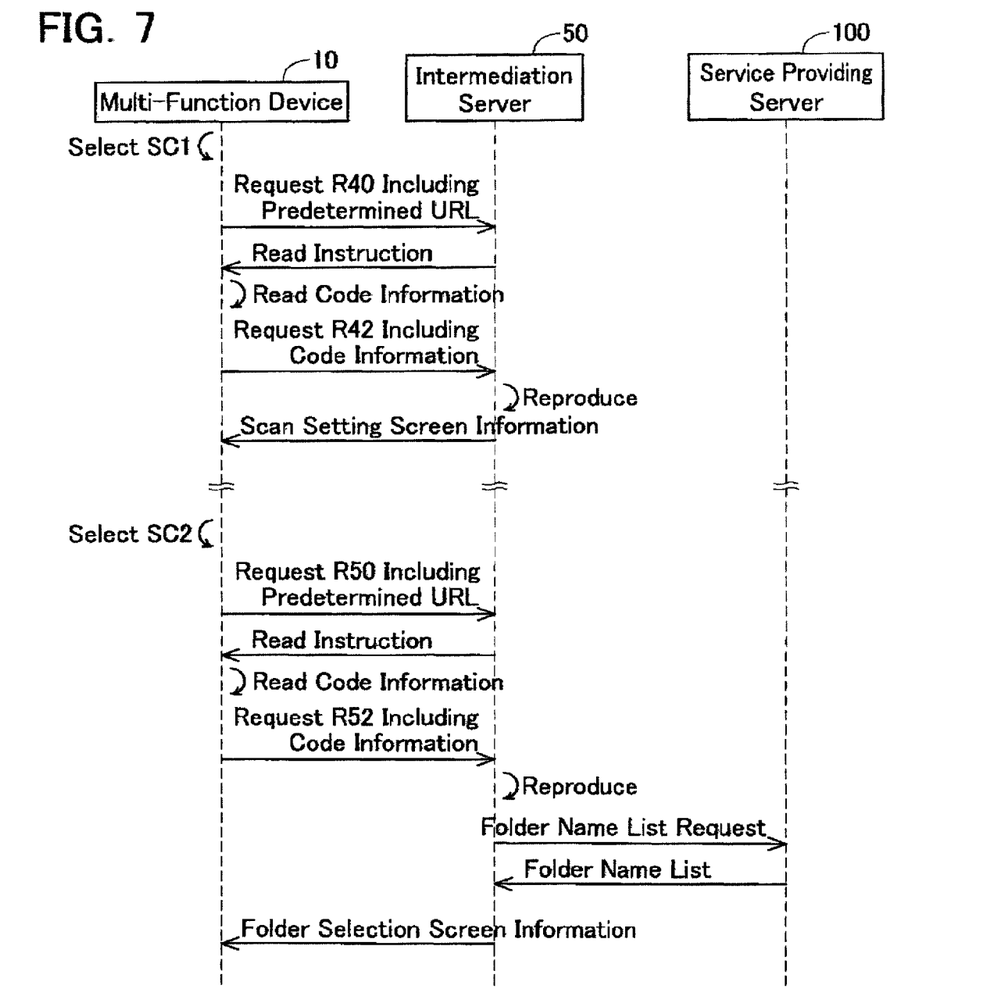
FIG. 7 shows a sequence view of processes executed by devices when a shortcut is selected.

(Processes in Case Shortcut is Selected; FIG. 7)

Next, the contents of processes executed by the devices 10, 50, 100 when the specific user selects the shortcut information (see FIG. 5 and FIG. 6) that is being stored in the memory 34 of the multi-function device 10 will be described with reference to FIG. 7.

Although not shown, the specific user operates the operation unit 12 to select a character string "Shortcut" included in the main screen 300. In this case, the display control unit 41 displays a shortcut selection screen 320 (see FIG. 8) on the display unit 14 by using shortcut selection screen information that was pre-stored in the multi-function device 10. The shortcut selection screen 320 includes character strings (e.g., "SC1", "SC2" etc.) indicating shortcut names included in the shortcut information that is being stored in the memory 34. The specific user can operate the operation unit 12 to select the character string "SC1" included in the shortcut selection screen 320. In this case, a request sending unit 46 (see FIG. 1) sends a request R40 that includes a predetermined URL (a URL that was pre-registered in the multi-function device 10) to the intermediation server 50.

Upon receiving the request R40 from the multi-function device 10, the control unit 60 of the intermediation server 50 sends a read instruction to the multi-function device 10.

An instruction receiving unit 47 (see FIG. 1) of the multi-function device 10 receives the read instruction from the intermediation server 50. In this case, a code information supplying unit 43 reads, from the memory 34, the five code information (see FIG. 5) associated with the character string "SC1" selected by the specific user. The code information supplying unit 43 supplies a request R42 that includes the five code information to the intermediation server 50. As described above, when communication of the request R40 and the read instruction is executed between the multi-function device 10 and the intermediation server 50, the multi-function device 10 can appropriately supply the request R42 that includes the five code information to the intermediation server 50.

Upon obtaining the request R42 from the multi-function device 10, the screen information supplying unit 70 of the intermediation server 50 creates, according to the ID table 68, five character strings (i.e., reproduces five character strings) from the five code information included in the request R42. In this case, although not shown, the intermediation server 50, e.g., obtains the display name table 36 from the multi-function device 10, and can determine whether the information included in the display name table 36 matches the created character strings ("Display Name=Alice", "Server Name=Server A", "PIN code=1234", "Access Token=XXXXXXXX"). In case of a negative judgement here, the intermediation server 50 need not execute the subsequent processes (i.e., supply of the scan setting screen information).

Based on the created five character strings, the screen information supplying unit 70 can learn which screen information the multi-function device 10 is requesting. That is, in this example, the five character strings include "Server Name=Server A" and "Screen Name=Scan Setting Screen", and consequently the screen information supplying unit 70 can learn that the multi-function device 10 is requesting scan setting screen information for the service providing server 100. Consequently, the screen information supplying unit 70 supplies the scan setting screen information to the multi-function device 10.

The screen information obtaining unit 40 of the multi-function device 10 obtains the scan setting screen information from the intermediation server 50. In this case, the display control unit 41 displays, on the display unit 14, the scan setting screen 308 (see FIG. 8) represented by the scan setting screen information. The subsequent processes are the same as the processes of FIG. 5.

On the other hand, the specific user can operate the operation unit 12 to select the character string "SC2" included in the shortcut selection screen 320. In this case, in the same manner as described above, the request sending unit 46 sends a request R50 that includes a predetermined URL to the intermediation server 50, and the instruction receiving unit 47 receives a read instruction from the intermediation server 50. In this case, the code information supplying unit 43 reads, from the memory 34, the five code information (see FIG. 6) associated with the character string "SC2" selected by the specific user. The code information supplying unit 43 supplies a request R52 that includes the five code information to the intermediation server 50.

Upon obtaining the request R52 from the multi-function device 10, the screen information supplying unit 70 of the intermediation server 50 reproduces the five character strings according to the ID table 68. Thereby, based on the five character strings, the screen information supplying unit 70 can learn the folder selection screen information which the multi-function device 10 is requesting. As in FIG. 6, the screen information supplying unit 70 obtains the folder name list from the service providing server 100, and supplies the folder selection screen information to the multi-function device 10.

The screen information obtaining unit 40 of the multi-function device 10 obtains the folder selection screen information from the intermediation server 50. In this case, the display control unit 41 displays, on the display unit 14, the folder selection screen 312 (see FIG. 8) represented by the folder selection screen information. The subsequent processes are the same as the processes of FIG. 6.

Effects of the Present Embodiment

According to the present embodiment, the multi-function device 10 can display the scan setting screen 308 and the folder selection screen 312 (see FIG. 8) on the display unit 14 by using a shortcut. Further, in case an instruction to create a shortcut is given by the specific user, the multi-function device 10 needs only to store code information (e.g., "0105Alice"), which has a comparatively small data size, in the memory 34, and does not need to store character strings (e.g., "Display Name=Alice"), which have a comparatively large data size, in the memory 34. Consequently, the data size to be stored in the memory 34 can be reduced. In particular, the storage capacity of the memory 34 of the multi-function device 10 is smaller than that of a PC, etc. Consequently, the technique of the present embodiment can be applied effectively to a device having a comparatively small storage capacity, such as the multi-function device 10.

Further, in the present embodiment, in case an instruction to create a shortcut is given by the specific user, the intermediation server 50 creates the code information, and supplies the code information to the multi-function device 10. Consequently, programs (e.g., the ID table 68, etc.) for creating the code information do not need to be stored in the multi-function device 10, allowing the amount of programs the multi-function device 10 must store to be reduced. Further, in case an instruction to select a shortcut is given by the specific user, the intermediation server 50 can obtain the code information from the multi-function device 10 and create (i.e., reproduce) the character strings from the code information. Thereby, based on the character strings, the intermediation server 50 can supply appropriate screen information to the multi-function device 10.

(Corresponding Relationships)

The multi-function device 10 and the intermediation server 50 are respectively examples of the "function executing device" and the "server". Moreover, both the print function and scan function are an example of the "specific function". The scan setting screen 308 and the server name selection screen 302 are respectively examples of the "first screen" and the "second screen". Selection of the "register" button included in the scan setting screen 308, and selection of the character string indicating one shortcut name included in the shortcut selection screen 320 are respectively examples of the "creation instruction" and the "selection instruction". The five character strings (e.g., "Display Name=Mice") shown in FIG. 5 and the five code information (e.g., "0105Alice") shown in FIG. 5 are respectively examples of the "two or more character strings" and the "two or more code information". Further, the ID table 68 is an example of the "association information".

(Variant 1)

The "function executing device" is not limited to the multi-function device 10 that is capable of executing both the print function and scan function, but may be a printer capable of executing only the print function, or may be a scanner capable of executing only the scan function. Generally speaking, the "function executing device" may be any device capable of executing a specific function, which may include the print function, the scan function, or the combination thereof.

(Variant 2)

In the above embodiment, the storage control unit 42 stores five code information corresponding to the five character strings in the memory 34. Instead, the storage control unit 42 may store fewer than five code information in the memory 34. For example, the storage control unit 42 may store only two code information in the memory 34, these including the code information "030201" corresponding to the server name and the code information "050201" corresponding to the screen. In this type of variant, also, when the two code information are supplied to the intermediation server 50 from the multi-function device 10, the screen information supplying unit 70 can learn which screen the multi-function device 10 desires. Further, the storage control unit 42 may store only another two code information (e.g., the code information corresponding to the screen and the code information corresponding to the access token) in the memory 34. Generally speaking, the "storage control unit" may be any unit that stores two or more code information in the device-side memory. Similarly, the "two or more character strings" may include any combination of two or more character strings from among a character string relating to the name of the server (e.g., "Server Name=Server A"), a character string relating to the authentication information (e.g., "Access Token=XXXXXXXX"), and a character string relating to the name of the first screen (e.g., "Screen Name=Scan Setting Display").

(Variant 3)

In the above embodiment, in case the creation instruction for creating a shortcut is given, the code information creating unit 71 of the intermediation server 50 creates the code information from the character strings obtained from the multi-function device 10, and supplies the code information to the multi-function device 10. Instead, in case the creation instruction for creating a shortcut is given, the control unit of the multi-function device 10 may create the code information from the character strings, and the storage control unit 42 may store the code information created by the control unit of the multi-function device 10 in the memory 34. Generally speaking, the "two or more code information" may be created by the server, or may be created by the function executing device.

(Variant 4)

In the above embodiment, a shortcut is created in the case where the "register" button on the scan setting screen 308 is selected after the screens 302 to 306 have been displayed sequentially. Instead, e.g., the main screen 300 may further include a specific character string for instructing a shortcut to be created. The specific user may select character strings from the screens 302 to 306 after the specific character string included in the main screen 300 has been selected (i.e., after the shortcut creation instruction has been given). When the character string "Scan Upload" included in the function selection screen 306 is selected, the data supplying unit 44 may supply the five character strings to the intermediation server 50, the code information obtaining unit 45 may obtain the five code information from the intermediation server 50, and the storage control unit 42 may store the five code information in the memory 34. Generally speaking, the shortcut creation instruction may be given after the first screen and second screen have been displayed, as in the above embodiment, or may be given before the first screen and second screen are displayed, as in the present variant.

(Variant 5)

As shown in FIG. 7, in the above embodiment, in case the selection instruction for selecting a shortcut is given, communication of the request R40 and the read instruction is executed between the multi-function device 10 and the intermediation server 50, and then the code information supplying unit 43 reads the code information in the memory 34. Instead, in case the selection instruction for selecting a shortcut is given, the code information supplying unit 43 may read the code information in the memory 34 and supply the code information to the intermediation server 50 without the communication of the request R40 and the read instruction being executed.

(Variant 6)

In the above embodiments, the functions of the units 40 to 47, 70 to 71 are realized by the CPUs 32, 62 of the multi-function device 10 and the intermediation server 50 executing processes according to software. Instead, at least a part of the functions of the units 40 to 47, 70 to 71 may be realized by hardware such as a logic circuit, etc.

The invention claimed is:

1. A function executing device configured to execute a plurality of functions including a print function and a scan function, the function executing device comprising:
   a device-side memory;
   a processor; and
   an instruction memory configured to store computer-readable instructions therein, the computer-readable instructions, when executed by the processor, causing the function executing device to perform:
   obtaining, from an intermediation server on the Internet, server selection screen information which represents a server selection screen for selecting one server from among one or more service providing servers on the Internet which are different from the intermediation server, each of the one or more service providing servers being capable of providing at least one of an image supply service and an image storing service;
   causing a display unit of the function executing device to display the server selection screen represented by the obtained server selection screen information;
   supplying, to the intermediation server, server information indicating the one server selected via the server selection screen;
   obtaining, from the intermediation server, function selection screen information which represents a function selection screen for selecting one function from among the plurality of functions including the print function and the scan function;
   causing the display unit to display the function selection screen represented by the obtained function selection screen information;
   supplying, to the intermediation server, function information indicating the one function selected via the function selection screen;
   obtaining, from the intermediation server, setting selection screen information which represents a setting selection screen for selecting setting information which is necessary for receiving a service from the selected one server and which is necessary for executing the selected one function, wherein, in a case where the selected one function is the print function, the setting selection screen includes a screen for selecting target image data of print target from among a plurality of image data stored in the selected one server, and in a case where the selected one function is the scan function, the setting selection screen includes a screen for selecting a scan setting;
   causing the display unit to display the setting selection screen represented by the obtained setting selection screen information;
   receiving the image supply service from the selected one server so as to obtain the selected target image data from the selected one server, in the case where the selected one function is the print function;
   executing the print function by using the obtained target image data, in the case where the selected one function is the print function;
   executing the scan function by using the selected scan setting, in the case where the selected one function is the scan function;
   supplying scan data created by executing the scan function so as to receive the image storing service from the selected one server, in the case where the selected one function is the scan function;
   in a case where a creation instruction for creating a shortcut is given when a predetermined screen is displayed on the display unit, obtaining from the intermediation server, code information corresponding to the selected one server and the selected one function, the code information having a data size which is less than a data size of character strings for specifying the selected one server and the selected one function, wherein, in the case where the selected one function is the print function, first code information corresponding to the selected one server and the print function is obtained, and in the case where the selected one function is the scan function, second code information corresponding to the selected one server and the scan function is obtained;

storing an association of the obtained code information and shortcut identification information in the device-side memory, wherein, in the case where the first code information is obtained, an association of the first code information and first shortcut identification information is stored in the device-side memory, and in the case where the second code information is obtained, an association of the second code information and second shortcut identification information is stored in the device-side memory;

causing the display unit to display a shortcut selection screen indicating the shortcut identification information;

in response to the shortcut identification information being selected via the shortcut selection screen, reading the code information associated with the selected shortcut identification information from the device-side memory;

supplying, to the intermediation server, the code information which has been read from the device-side memory, wherein, in a case where the first shortcut identification information is selected, the first code information is supplied to the intermediation server, and in a case where the second shortcut identification information is selected, the second code information is supplied to the intermediation server; and in response to supplying the code information, obtaining, from the intermediation server, the setting selection screen information without selecting the one server via the server selection screen and without selecting the one function via the function selection screen, wherein, in a case where the first code information is supplied to the intermediation server, the setting selection screen information representing the screen for selecting target image data is obtained, and in a case where the second code information is supplied to the intermediation server, the setting selection screen information representing the screen for selecting a scan setting is obtained.

2. The function executing device as in claim 1, wherein the computer-readable instructions, when executed by the processor, cause the function executing device to further perform:

in response to the shortcut identification information being selected via the shortcut selection screen, sending a request including predetermined location information to the intermediation server; and in response to sending the request to the intermediation server, receiving, from the intermediation server, an instruction for reading the code information within the device-side memory, wherein, in response to receiving the instruction from the intermediation server, the reading of the code information from the device-side memory is performed.

3. The function executing device as in claim 1, wherein the creation instruction is given when the predetermined screen which is the settings selection screen is displayed, and cc the code information does not include information corresponding to the selected setting information.

4. The function executing device as in claim 1, wherein the predetermined screen is the setting selection screen, and the setting selection screen includes a button for inputting the creation instruction.

5. The function executing device as in claim 1, wherein the computer-readable instructions, when executed by the processor, causing the function executing device to perform:

supplying, to the intermediation server, specific authentication information for using the selected one server, wherein the code information includes the specific authentication information.

6. The function executing device as in claim 5, wherein the code information includes:

a combination of an ID indicating a server, a code indicating the selected one server, and a data size of a text indicating the code;

a combination of an ID indicating a function, a code indicating the selected one function, and a data size of a text indicating the code; and a combination of an ID indicating authentication information, the specific authentication information, and a data size of a text indicating the specific authentication information.

7. An intermediation server configured to be connected with a function executing device configured to execute a plurality of functions including a print function and a scan function, the intermediation server comprising:

a processor; and a server-side memory configured to store a first table including a plurality of combinations, each of the plurality of combinations being a combination of a setting value and a code, the server-side memory configured to further store computer-readable instructions therein, the computer-readable instructions, when executed by the processor, causing the intermediation server to perform:

supplying, to the function executing device, server selection screen information which represents a server selection screen for selecting one server from among one or more service providing servers on the Internet which are different from the intermediation server, each of the one or more service providing servers being capable of providing at least one of an image supply service and an image storing service;

obtaining, from the function executing device, server information indicating the one server selected via the server selection screen displayed in the function executing device;

supplying, to the function executing device, function selection screen information which represents a function selection screen for selecting one function from among the plurality of functions including the print function and the scan function;

obtaining, from the function executing device, function information indicating the one function selected via the function selection screen displayed in the function executing device;

supplying, to the function executing device, setting selection screen information which represents a setting selection screen for selecting setting information which is necessary for the function executing device to receive a service from the selected one server and which is necessary for the function executing device to execute the selected one function, wherein, in a case where the selected one function is the print function, the setting selection screen includes a screen for selecting target image data of print target from among a plurality of image data stored in the selected one server, and in a case where the selected one function is the scan function, the setting selection screen includes a screen for selecting a scan setting;

in a case where a creation instruction for creating a shortcut is given when a predetermined screen is displayed in the function executing device, creating code information corresponding to the selected one server and the selected one function by using the first table stored in the server-side memory, the code information having a data size which is less than a data size of character strings for specifying the selected one server and the selected one function, wherein, in the case where the selected one function is the print function, first code information corresponding to the selected one server and the print function is created by reading, from the first table, codes corresponding to setting values indicating the selected one server and the print function, and in the case where the selected one function is the scan function, second code information corresponding to the selected one server and the scan function is created by reading, from the first table, codes corresponding to setting values indicating the selected one server and the scan function from the table;

supplying the created code information to the function executing device;

obtaining the code information from the function executing device in a case where shortcut identification information is selected via a shortcut selection screen displayed in the function executing device, wherein, in a case where first shortcut identification information is selected in the function executing device, the first code information is obtained from the function executing device, and in a case where second shortcut identification information is selected, the second code information is obtained from the function executing device in the function executing device; and in response to obtaining the code information, supplying the setting selection screen information to the function executing device without supplying the server selection screen information and the function selection screen information, wherein, in a case where the first code information is obtained from the function executing device, the setting selection screen information representing the screen for selecting target image data is supplied to the function executing device, and in a case where the second code information is obtained from the function executing device, the setting selection screen information representing the screen for selecting a scan setting is supplied to the function executing device.

8. The intermediation server as in claim 7, wherein the server-side memory is configured to further store a second table including a plurality of combinations, each of the plurality of combinations being a combination of an item and an ID, the item being either a first type of item or a second type of item, the first type of item being an item in which information is described in the first table, the second type of item being an item in which information is not described in the first table, and wherein the creating of the code information includes:

specifying, from the second table, an ID being combined with the first type of item;

specifying, from the first table, a code being combined with a setting value which is selected in the function executing device;

specifying a data size of a text indicating the specified code which is specified from the first table;

creating first partial code information including a combination of the specified ID, the specified data size, and the specified code;

specifying, from the second table, an ID being combined with the second type of item;

specifying a data size of a setting value which is selected in the function executing device;

creating second partial code information including a combination of the specified ID, the specified data size, and the setting value; and creating the code information including the first partial code information and the second partial code information.

9. A non-transitory computer-readable medium for an intermediation server configured to be connected with a function executing device configured to execute a plurality of functions including a print function, a scan function, or the non-transitory computer-readable medium storing computer-readable instructions, when executed by a processor of the intermediation server, causing the intermediation server to perform:

supplying, to the function executing device, server selection screen information which represents a server selection screen for selecting one server from among one or more service providing servers on the Internet which are different from the intermediation server, each of the one or more service providing servers being capable of providing at least one of an image supply service and an image storing service;

obtaining, from the function executing device, server information indicating the one server selected via the server selection screen displayed in the function executing device;

supplying, to the function executing device, function selection screen information which represents a function selection screen for selecting one function from among the plurality of functions including the print function and the scan function;

obtaining, from the function executing device, function information indicating the one function selected via the function selection screen displayed in the function executing device;

supplying, to the function executing device, setting selection screen information which represents a setting selection screen for selecting setting information which is necessary for the function executing device to receive a service from the selected one server and which is necessary for the function executing device to execute the selected one function, wherein, in a case where the selected one function is the print function, the setting selection screen includes a screen for selecting target image data of print target from among a plurality of image data stored in the selected one server, and in a case where the selected one function is the scan function, the setting selection screen includes a screen for selecting a scan setting;

in a case where a creation instruction for creating a shortcut is given when a predetermined screen is displayed in the function executing device, creating code information corresponding to the selected one server and the selected one function by using the first table stored in the server-side memory, the code information having a data size which is less than a data size of character strings for specifying the selected one server and the selected one function, wherein, in a case where the selected one function is the print function, first code information corresponding to the selected one server and the print function is created by reading, from the first table, codes corresponding to setting values indicating the selected one server and the print function, and in the case where the selected one function is the scan function, second code information corresponding to the selected one server and the scan function is created by reading, from the first table, codes corresponding to setting values indicating the selected server and the scan function from the table;

supplying the created code information to the function executing device;

obtaining the code information from the function executing device in a case where shortcut identification information is selected via a shortcut selection screen displayed in the function executing device, wherein in a case where first shortcut identification information is selected in the function executing device, the first code information is obtained from the function executing device, and in a case where second shortcut identification information is selected, the second code information is obtained from the function executing device in the function executing device; and in response to obtaining the code information, supplying the setting selection screen information to the function executing device without supplying the server selection screen information and the function selection screen information, wherein, in a case where the first code information is obtained from the function executing device, the setting selection screen information representing the screen for selecting target image data is supplied to the function executing device, and in a case where the second code information is obtained from the function executing device, the setting selection screen information representing the screen for selecting a scan setting is supplied to the function executing device.

* * * * *